US012536767B2

(12) United States Patent
Yin et al.

(10) Patent No.: US 12,536,767 B2
(45) Date of Patent: Jan. 27, 2026

(54) WEAKLY SUPERVISED SEMANTIC SEGMENTATION METHOD AND DEVICE BASED ON A COMMONALITY-SPECIFICITY SUPERVISION MECHANISM

(71) Applicant: ZHEJIANG UNIVERSITY, Hangzhou (CN)

(72) Inventors: Jianwei Yin, Hangzhou (CN); Ge Su, Hangzhou (CN); Tiancheng Zhao, Hangzhou (CN); Hangjin Jiang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 288 days.

(21) Appl. No.: 18/288,552

(22) PCT Filed: May 8, 2023

(86) PCT No.: PCT/CN2023/092763
§ 371 (c)(1),
(2) Date: Oct. 26, 2023

(87) PCT Pub. No.: WO2024/212297
PCT Pub. Date: Oct. 17, 2024

(65) Prior Publication Data
US 2025/0157176 A1 May 15, 2025

(30) Foreign Application Priority Data

Apr. 13, 2023 (CN) .......................... 202310388689.9

(51) Int. Cl.
*G06V 10/26* (2022.01)
*G06V 10/764* (2022.01)
(52) U.S. Cl.
CPC ............ *G06V 10/26* (2022.01); *G06V 10/764* (2022.01)

(58) Field of Classification Search
CPC . G06T 2207/20084; G06T 2207/20081; G06T 11/60; G06T 2200/24; G06T 5/77;
(Continued)

(56) References Cited

U.S. PATENT DOCUMENTS

2021/0035304 A1   2/2021  Jie
2021/0118136 A1*  4/2021  Hassan-Shafique ... G16B 20/20

FOREIGN PATENT DOCUMENTS

| CN | 111723813 | 9/2020 |
| CN | 113221905 | 8/2021 |

(Continued)

OTHER PUBLICATIONS

Zhang, ACCL: Adversarial constrained-CNN loss for weakly supervised medical image segmentation, May 1, 2020, arXir (Year: 2020).*

(Continued)

*Primary Examiner* — Alex Kok S Liew
(74) *Attorney, Agent, or Firm* — Jiwen Chen; Joywin IP Law PLLC

(57) ABSTRACT

The present invention discloses a weakly supervised semantic segmentation method and device based on a commonality-specificity supervision mechanism, the contrastive convolution module is established to identify ambiguous boundary regions within the image based on the convolutional cognitive differences of different receptive fields within the image, overcoming the problem of blurred segmentation boundaries in weakly supervised semantic segmentation tasks; the commonality-specificity supervision module is established, using the commonality supervision mechanism to discover similar structural background distributions between different classes of images, the specificity supervision mechanism is used to identify prominent regions in the image distribution and achieve semantic segmentation (Continued)

of the target object, this not only improves the sparsity of the localization region, but also optimized the segmentation boundary; the knowledge gap module constructs the contrastive generated images with enhanced structural distribution, the knowledge gap between the contrastive generated images and the class images effectively overcomes the incomplete activation correspondence in mainstream methods and improves the weakly supervised semantic segmentation performance at the image level.

10 Claims, 5 Drawing Sheets

(58) Field of Classification Search
CPC ... G06T 11/00; G06T 5/60; G06T 7/11; G06T 5/70; G06T 2207/30196; G06T 5/50; G06T 7/70; G06T 2207/10016; G06T 2207/20021; G06T 2207/20092; G06T 7/194; G06T 2207/30024; G06T 2207/10056; G06T 2207/20221; G06T 7/0012; G06T 2207/20036; G06T 2207/20104; G06T 2207/10064; G06T 2207/10132; G06T 7/0016; G06T 11/001; G06T 2207/10136; G06T 7/12; G06T 15/205; G06T 2207/30048; G06T 3/4046; G06T 13/20; G06T 2200/08; G06T 2207/10028; G06T 2207/20004; G06T 2207/20212; G06V 10/82; G06V 10/764; G06V 10/774; G06V 20/70; G06V 10/25; G06V 20/46; G06V 10/761; G06V 10/26; G06V 10/40; G06V 20/41; G06V 40/161; G06V 10/44

See application file for complete search history.

(56) References Cited

FOREIGN PATENT DOCUMENTS

| CN | 113239924 | 8/2021 |
|---|---|---|
| CN | 113706547 | 11/2021 |

OTHER PUBLICATIONS

R. Abdelfattah, X. Wang and S. Wang, "PLGAN: Generative Adversarial Networks for Power-Line Segmentation in Aerial Images," in IEEE Transactions on Image Processing, vol. 32, pp. 6248-6259, 2023 (Year: 2023).*

* cited by examiner

WEAKLY SUPERVISED SEMANTIC SEGMENTATION METHOD AND DEVICE BASED ON A COMMONALITY-SPECIFICITY SUPERVISION MECHANISM

This is a U.S. national stage application of PCT Application No. PCT/CN2023/092763 under 35 U.S.C. 371, filed May 8, 2023 in Chinese, claiming priority of Chinese Application No. 202310388689.9, filed Apr. 13, 2023, all of which are hereby incorporated by reference.

TECHNICAL FIELD

The present invention belongs to the field of image level weakly supervised semantic segmentation, and specifically relates to a weakly supervised semantic segmentation method and device based on a commonality-specificity supervision mechanism.

DESCRIPTION OF RELATED ART

In recent years, with the development of large-scale deep learning networks and a large number of pixel level semantic annotations, semantic segmentation has achieved great success in various real-world applications, such as autonomous driving, robotics, and medical diagnosis. However, these models heavily rely on a large number of pixel level annotations, which require intensive human labor. On the contrary, some weakly supervised annotations, such as image level labels, points, graffiti, and bounding boxes, are easily obtainable. Therefore, exploring the potential of weakly supervised annotation in semantic segmentation tasks is extremely attractive work.

Solving the problem of weakly supervised semantic segmentation at the image level is extremely challenging, as image level annotation can only indicate whether the target object exists in an image, but lacks necessary positional information. In order to solve this issue, mainstream methods mainly utilize class activation diagrams to endow convolutional networks with localization capabilities, such as a method based on causal interference C-CAM (Zhang, Dong, et al., "Causal interference for weakly supervised semantic segmentation." Advances in Neural Information Processing Systems 33 (2020): 655-666), a method based on regional semantic RCA (Zhou, Tianfei, et al. "Regional semantic contrast and aggregation for weakly supervised semantic segmentation." Proceedings of the IEEE/CVF Conference on Computer Vision and Pattern Recognition. 2022).

However, the above activation maps methods can only identify the most discriminative regions in the image, which leads to two main problems. One is the erroneous negative example, where the activation region is often sparse and the target object region with activation error is used as the background region; the second is a positive example of an error, where the activation region is overflow and the background region with activation error is used as the target object. The incomplete activation correspondence limits the performance of class activation maps methods, resulting in severe sparsity of localization regions and blurred segmentation boundaries. Some recent work is attempting to use different network frameworks or training strategies to solve the problem of incomplete activation correspondence.

Therefore, exploring an image level weakly supervised semantic segmentation method to avoid the problem of incomplete activation correspondence in class activation maps and improve the localization and boundary segmentation capabilities of weakly supervised labels for semantic segmentation has become an urgent technical problem to be solved.

SUMMARY OF THE INVENTION

Giving the above, the object of the present invention is to provide a weakly supervised semantic segmentation method and device based on the commonality-specificity supervision mechanism, which improves the localization ability and accuracy of weakly supervised labels for semantic segmentation by overcoming the technical defects corresponding to incomplete activation relationships in class activation maps.

In order to achieve the above invention objectives, the present invention provides the following solutions:

A weakly supervised semantic segmentation method based on the commonality-specificity supervision mechanism, comprising the following steps:

establishing a class 1 dataset and a class 2 dataset, the class 1 dataset contains class 1 images and their image level labels, and the class 2 dataset contains class 2 images and their image level labels;

establishing a weakly supervised semantic segmentation model, which includes an embedding layer, a contrastive convolution module, a commonality-specificity supervision module, a generator, a discriminator, and a knowledge gap module, the embedding layer is used to spatially maps the class 1 images and the class 2 images to obtain embedded representations, while the contrastive convolution module is used to spatially enhance the embedded representations to obtain enhanced distribution representations, the commonality-specificity supervision module is used to construct specificity supervision maps based on the enhanced distribution representations by using a commonality supervision mechanism, specificity supervision maps based on the commonality supervision maps are constructed by using a specificity supervision, a specific class target object region is constructed based on the commonality supervision maps and the specificity supervision map, a generator is used to generate contrast generated images based on the target object region, and the discriminator is used to distinguish the authenticity of the contrast generated images, the knowledge gap module is used to generate semantic segmentation results based on the class 1 images and their corresponding contrast generated images;

establishing an objective function for the weakly supervised semantic segmentation model, the objective function comprises an adversarial loss for training the generator and discriminator and a consistency loss for constructing the structural consistency between the contrast generated images and the class 1 images based on semantic segmentation results;

using the class 1 dataset and the class 2 dataset, and utilizing the objective function to optimize the parameters of the weakly supervised semantic segmentation model;

the weakly supervised semantic segmentation model optimized by parameters is used to segment the target image to be detected, and semantic segmentation annotations at the pixel level of the target image are obtained.

Preferably, the embedding layer comprises a sequentially connected boundary filling layer, a two-dimensional convolutional layer, an instance regularization layer, and a linear rectification activation layer, the embedded representations Embedding1 of the class 1 images and the embedded representations Embedding2 of the class 2 images are obtained by spatially mapping the class 1 images and the class 2 images through the embedding layer.

Preferably, the contrastive convolutional module comprises a dual channel mode, wherein, the first channel comprises a sequentially connected two-dimensional convolutional layer and a linear rectification activation layer, extracting the corresponding standard local representation S_Embedding1 based on the embedded representations Embedding1 of the Class 1 images, and extracting the corresponding standard local representation S_Embedding2 based on the embedded representations Embedding2 of the Class 2 images;

The second channel comprises contrastive convolution, the contrastive convolution comprises an extended convolution layer and a two-dimensional convolution layer, extracting the corresponding difference representation D_Embedding1 based on the embedded representations Embedding 1 of the class 1 images, and extracting the corresponding difference table D_Embedding2 based on the embedded representations Embedding 2 of the class 2 images;

The contrastive convolution module also comprises class activation maps calculation operation and enhanced representation calculation operation, specifically:

utilizing the difference representations D_Embedding1 and the difference representations D_Embedding2 to calculate a class activation maps $M1^{ca}$ corresponding to the class 1 images and a class activation maps D_Embedding2 corresponding to the class 2 images, respectively;

making the class activation maps $M1^{ca}$ and the standard local representation S_Embedding1 dot product to obtain the enhanced distribution representations E_Embedding1 of the class 1, and making the class activation maps $M2^{ca}$ and the standard local representation S_Embedding2 dot product to obtain the enhanced distribution representations E_Embedding2.

Preferably, in the commonality-specificity supervision module, constructing the specificity supervision maps based on the enhanced distribution representations by using the commonality supervision mechanism, comprising:

projecting the enhancement distribution representations E_Embedding1 onto a Reshape layer for size adjustment to obtain a reorganized distribution E_Embedding1$^{re}$ of the class 1 images;

projecting the enhancement distribution representations E_Embedding2 onto an average buffer, the enhancement distribution representations E_Embedding2 is arranged in order and the average value is calculated to represent a mean enhancement distribution representation E_Embedding2$^{ave}$ of the class 2 images;

projecting the enhanced distribution representation E_Embedding2$^{ave}$ onto a SE layer to extract key structural features;

calculating an element correlation matrix R for the class 1 images and the class 2 images based on the E_Embedding2$^{ave}$ of the class 2 images and the reorganized distribution E_Embedding1$^{re}$ of the class 1 images;

calculating the specificity supervision maps $M_c$ based on the element correlation matrix R and the reorganized distribution E_Embedding1$^{re}$.

Preferably, in the commonality-specificity supervision module, the specificity supervision maps based on the commonality supervision maps are constructed by using the specificity supervision, comprising:

reverse mapping the specificity supervision maps $M_c$ to obtain a reverse mapping maps $M_c'$, the calculation process is:

$$M_c' = \begin{cases} 1, & \text{softmax}(M_c(i,\ j)) < 0.5 \\ 0, & \text{softmax}(M_c(i,\ j)) \geq 0.5 \end{cases}$$

the calculation process of the commonality supervision maps $M_s$ based on the reverse mapping maps $M_c'$:

$$M_s = \text{Reshape}^{-1}(\text{E\_Embedding1}^{re}) \times M_c'$$

wherein, softmax represents the softmax function, Reshape represents the reshape function.

Preferably, in the commonality-specificity supervision module, the specific class target object region is constructed based on the commonality supervision maps and the specificity supervision map, comprising:

the specificity supervision maps $M_c$ is added to the embedded representations Embedding1 of the Class 1 images and the embedded representations Embedding2 of the Class 2 images, resulting in general structure enhanced representations of the Class 1 images and general structure enhanced representations of the Class 2 images, the commonality supervision maps $M_s$ is used to filter the specific class 1 target object region $F1_{cs}$ in the general structure enhanced representations of the Class 1 images, and the specific class 2 target object region $F2_{cs}$ in the general structure enhanced representations of the Class 2 images, the calculation process is:

$$F1_{cs} = \text{Embedding1} + M_c - M_s$$
$$F2_{cs} = \text{Embedding2} + M_c - M_s.$$

Preferably, in the knowledge gap module, generating semantic segmentation results based on the class 1 images and their corresponding contrast generated images, comprising:

using the difference between the class 1 images and their corresponding contrast generated images as the semantic segmentation results;

the adversarial loss $L_{adv}$ is represented as:

$$L_{adv} = -\sum_{i,j} \log(1 - D(G(F1_{cs}^{(i,j)}))) + \log(D(G(F2_{cs}^{(i,j)})))$$

the consistency loss is represented as:

$$L_{cons} = \text{up}(M_c) \cdot |Seg1|$$

among them, G represents the generator, D represents the discriminator, and $F1_{cs}^{(i,j)}$ represents element values of the specific class 1 target object regions $F1_{cs}$ corresponding to the class 1 images at position (i,j), and $F2_{cs}^{(i,j)}$ represents element values of the specific class 2 target object regions $F2_{cs}$ corresponding to the class 2 images at position (i,j), Seg1 represents the semantic segmentation results, I1 represents the class 1 images, and up( ) represents sampling the $M_c$ into the size of the class 1 images, $M_c$ represents the specificity supervision maps.

As a second aspect, the embodiment of the present invention provides a weakly supervised semantic segmentation device based on the commonality-specificity supervision mechanism comprising:

a dataset building module, establishing a class 1 dataset and a class 2 dataset, the class 1 dataset contains class 1 images and their image level labels, and the class 2 dataset contains class 2 images and their image level labels;

a module building module, establishing a weakly supervised semantic segmentation model, which includes an embedding layer, a contrastive convolution module, a commonality-specificity supervision module, a generator, a discriminator, and a knowledge gap module, the embedding layer is used to spatially maps the class 1 images and the class 2 images to obtain embedded representations, while the contrastive convolution module is used to spatially enhance the embedded representations to obtain enhanced distribution representations, the commonality-specificity supervision module is used to construct specificity supervision maps based on the enhanced distribution representations by using a commonality supervision mechanism, specificity supervision maps based on the commonality supervision maps are constructed by using a specificity supervision, a specific class target object region is constructed based on the commonality supervision maps and the specificity supervision map, a generator is used to generate the contrast generated images based on the target object region, and a discriminator is used to distinguish the authenticity of the contrast generated images, the knowledge gap module is used to generate semantic segmentation results based on the class 1 images and their corresponding contrast generated images;

an objective function building module, establishing an objective function for the weakly supervised semantic segmentation model, the objective function comprises an adversarial loss for training the generator and discriminator and a consistency loss for constructing the structural consistency between the contrast generated images and the class 1 images based on semantic segmentation results;

a parameter optimization module, using the class 1 dataset and the class 2 dataset, and utilizing the objective function to optimize the parameters of the weakly supervised semantic segmentation model;

a detection module, the weakly supervised semantic segmentation model optimized by parameters is used to segment the target image to be detected, and semantic segmentation annotations at the pixel level of the target image are obtained.

As a third aspect, the embodiment of the present invention provides a computing device, comprising a memory, a processor, and a computer program stored in the memory and executable on the processor, the processor implements the weakly supervised semantic segmentation method based on the commonality-specificity supervision mechanism as described above when executing the computer program.

As a fourth aspect, the embodiment of the present invention provides a computer-readable storage medium on which a computer program is stored, the weakly supervised semantic segmentation method based on the commonality-specificity supervision mechanism as described above when the computer program is processed and executed.

Compared with the prior art, the beneficial effects of the present invention at least comprises:

Firstly, the contrastive convolution module is established to identify ambiguous boundary regions within the image based on the convolutional cognitive differences of different receptive fields within the image, overcoming the problem of blurred segmentation boundaries in weakly supervised semantic segmentation tasks; next, the commonality-specificity supervision module is established, using the commonality supervision mechanism to discover similar structural background distributions between different classes of images, the specificity supervision mechanism is used to identify prominent regions in the image distribution and achieve semantic segmentation of the target object, this not only improves the sparsity of the localization region, but also optimized the segmentation boundary; finally, the knowledge gap module will input the images with enhanced internal distribution and similarity structural distribution between images to the generator, constructing the contrastive generated images with enhanced structural distribution, the knowledge gap between the contrastive generated images and the class images effectively overcomes the incomplete activation correspondence in mainstream methods and improves the weakly supervised semantic segmentation performance at the image level.

BRIEF DESCRIPTION OF THE DRAWINGS

For a clearer explanation of the embodiments of the present invention or the technical solutions in the prior art, a brief introduction will be given to the accompanying drawings required in the description of the embodiments or prior art. It is evident that the accompanying drawings in the following description are only some embodiments of the present invention. For ordinary technical personnel in the art, other accompanying drawings can be obtained based on these drawings without any creative effort.

DETAILED DESCRIPTION OF THE INVENTION

In order to make the purpose, technical solution, and advantages of the present invention clearer, the following is a further detailed explanation of the present invention in conjunction with the accompanying drawings and embodiments. It should be understood that the specific embodiments described here are only used to explain the present invention and do not limit the scope of protection of the present invention.

The current mainstream weakly supervised semantic segmentation methods mainly use class labels at as image level supervisory signals, and class activation maps (CAM) as the main localization region of the target object. However, these class activation maps methods can only identify the most discriminative region in the image, which leads to two main problems: first, erroneous negative samples, the activation region is often sparse, and activating erroneous target object region is taken as background region; the second is erroneous positive samples, where the activation region is overflow and the erroneous background region is used as the target object. The incomplete activation correspondence limits the performance of class activation maps methods, resulting in severe sparsity of localization regions and blurred segmentation boundaries.

To solve the above issues, an embodiment of the present invention proposes a weakly supervised semantic segmentation method and device based on the commonality-specificity supervision mechanism, aiming to enhance the internal structure distribution of images by comparing convolutions, removing ambiguous boundary regions, overcoming the problem of boundary blurring caused by activation region overflow, and reducing erroneous positive samples; mining the similar structural distribution between images by utilizing the commonality-specificity supervision mechanism, and separating the specific target segmentation regions between images, which strengthens the commonality-specificity distribution pattern between images, overcomes the localization problem caused by sparse activation regions, and avoids erroneous negative samples, finally, weakly supervised semantic segmentation is achieved by using a knowledge gap module between different classes of images. This method and device can be applied to medical lesion segmentation and other applications.

Figure 1:
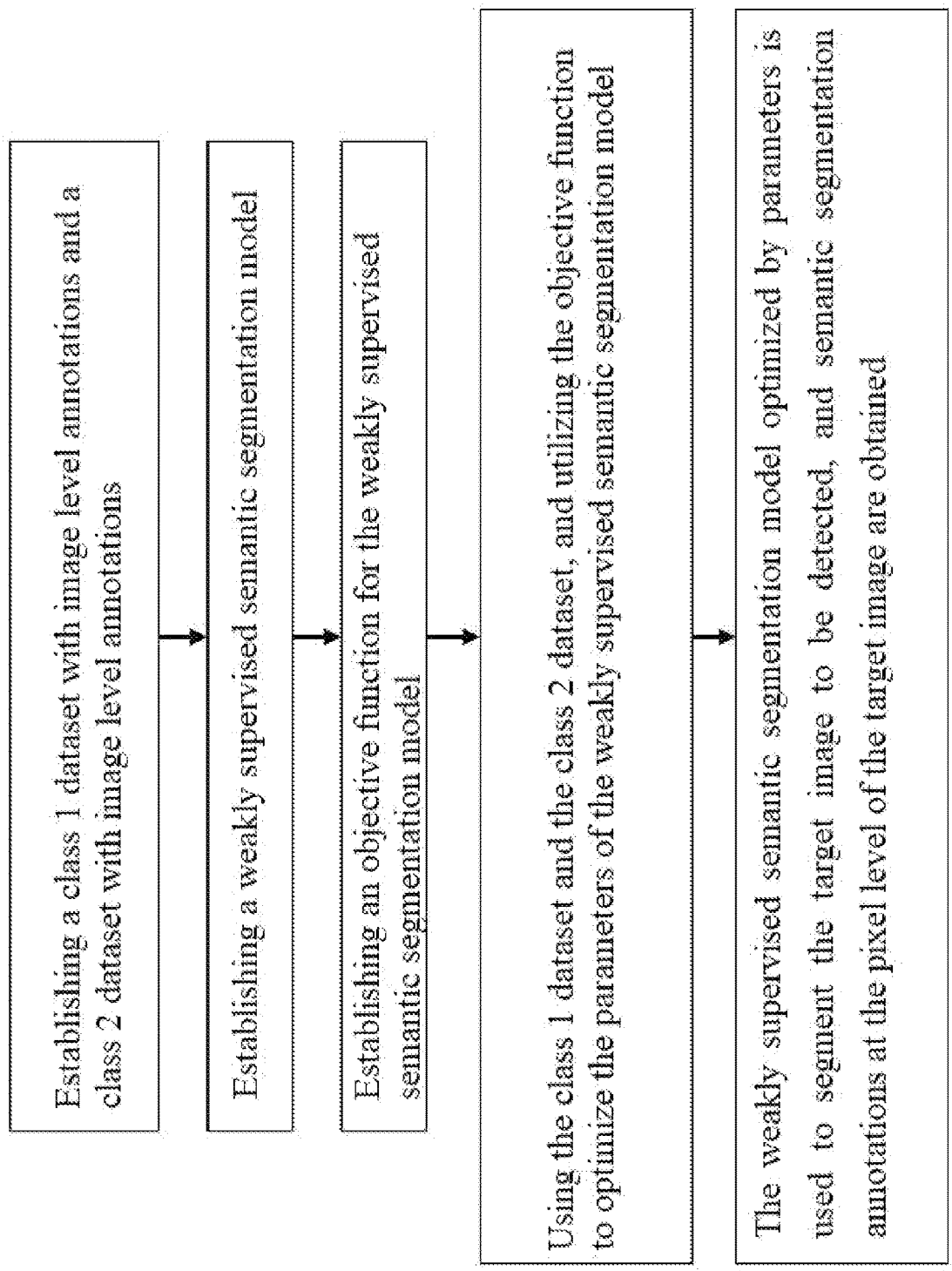
FIG. 1 is a flowchart of a weakly supervised semantic segmentation method based on the commonality-specificity supervision mechanism in an embodiment.

As shown in FIG. 1, the embodiment provides a weakly supervised semantic segmentation method based on the commonality-specificity supervision mechanism, comprising the following steps:

Step 1, establishing a class 1 dataset with image level annotations and a class 2 dataset with image level annotations;

In the embodiment, the class 1 dataset contains class 1 images and their image level labels, and the class 2 dataset contains class 2 images and their image level labels. The distribution of background structures of the class 1 images and the class 2 images often has similar structural distributions, but there are clear distinctions in specific classes.

Step 2, establishing a weakly supervised semantic segmentation model.

Figure 2:
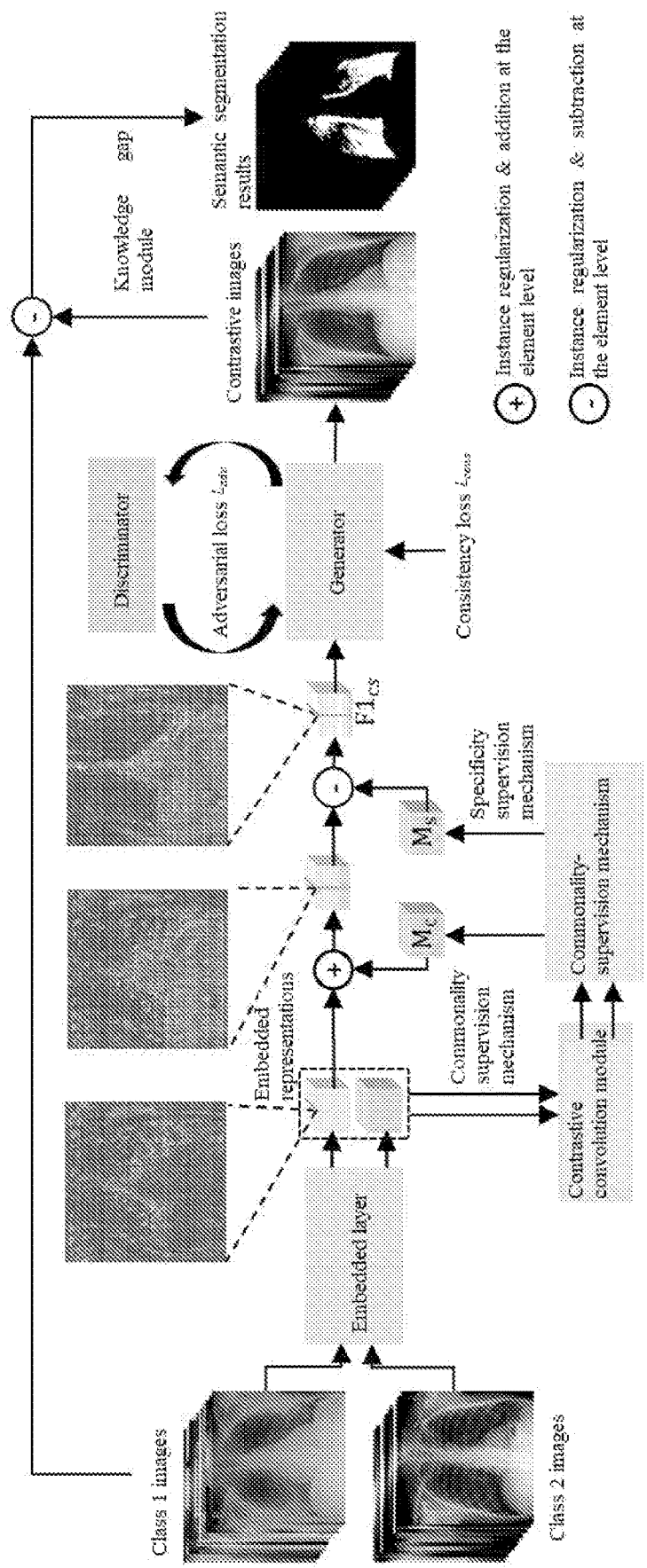
FIG. 2 is a schematic diagram of the weakly supervised semantic segmentation model in an embodiment.

As shown in the FIG. 2, the established weakly supervised semantic segmentation model comprises an embedding layer, a contrastive convolution module, a commonality-specificity supervision module, a generator, a discriminator, and a knowledge gap module.

In the embodiment, the embedding layer is used to embedding representation space mapping of the Class 1 images and the Class 2 images, specifically, the class 1 images and the class 2 images are spatially mapped to obtain embedded representations. The embedding layer adopts but is not limited to the following network structure. Below is an example of an available embedding layer, comprising a sequentially connected boundary filling layer (ReflectionPad2d( )), a two-dimensional convolutional layer (Conv2d( )), an instance regularization layer (InstanceNorm2d( )), and a linear rectification activation layer(ReLU( )), the class 1 images and the class 2 images are mapping to a embedded representation space, the embedded representations Embedding1 of the class 1 images and the embedded representations embedding2 of the class 2 images are obtained.

Figure 3:
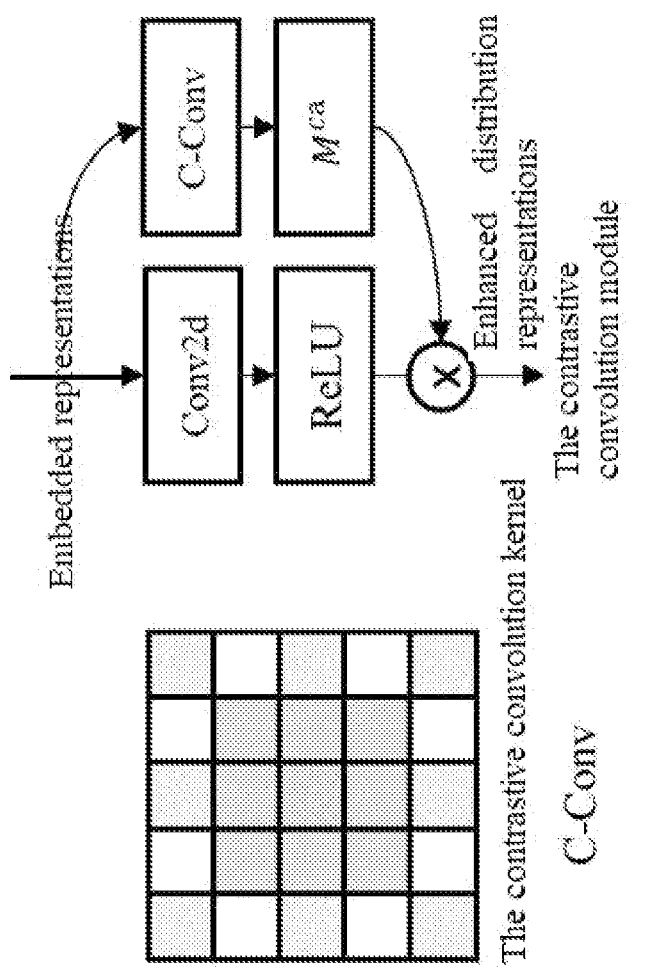
FIG. 3 is a schematic diagram of the contrastive convolution module of the weakly supervised semantic segmentation model in an embodiment.

The contrastive convolution module is used to feature space augmentation of representations, and the embedded representations are specifically enhanced to obtain enhanced distribution representations. As shown in FIG. 2 and FIG. 3, the contrastive convolutional module comprises a dual channel mode, wherein, the first channel comprises a sequentially connected two-dimensional convolutional layer(Conv2d( )) and a linear rectification activation layer(ReLU( )), extracting the corresponding standard local representation S_Embedding1 based on the embedded representations Embedding1 of the Class 1 images, and extracting the corresponding standard local representation S_Embedding2 based on the embedded representations Embedding2 of the Class 2 images, the calculation process is:

$$S\_Embedding1_{i,j} = \max\left(0, \sum_{p,q} W^{c1}_{p,q} \text{Embedding1}_{i-\lfloor\frac{k}{2}\rfloor+p, j-\lfloor\frac{k}{2}\rfloor+q}\right)$$

$$S\_Embedding2_{i,j} = \max\left(0, \sum_{p,q} W^{c1}_{p,q} \text{Embedding2}_{i-\lfloor\frac{k}{2}\rfloor+p, j-\lfloor\frac{k}{2}\rfloor+q}\right)$$

wherein, k represents the edge length of a convolutional kernel in a 2D convolutional Layer, Embedding1$_{i,j}$ represents input element of Embedding1 at position (i,j), $W_{p,q}^{c1}$ represents the weight parameter of the first channel in the two-dimensional convolutional kernel at position (p,q), $$\sum_{p,q} W^{c1}_{p,q} \text{Embedding1}_{i-\lfloor\frac{k}{2}\rfloor+p, j-\lfloor\frac{k}{2}\rfloor+q}$$

represents weighted summation of all input elements of the Embedding1 representations with a local range k×k and weights $W_{p,q}^{c1}$ of corresponding position, $$\sum_{p,q} W^{c1}_{p,q} \text{Embedding2}_{i-\lfloor\frac{k}{2}\rfloor+p, j-\lfloor\frac{k}{2}\rfloor+q}$$

represents weighted summation of all input elements of the Embedding2 representations with a local range k×k and weights $W_{p,q}^{c1}$ of corresponding position, max ( ) represents select maximum function.

The second channel comprises contrastive convolution (C-Conv) for calculating the differences in the distribution of internal structure in images, the contrastive convolution (C-Conv) comprises an extended convolution layer(D-Conv2d( )) and a two-dimensional convolution layer (Conv2d( )), extracting the corresponding difference representation D_Embedding1 based on the embedded representations Embedding 1 of the class 1 images, and extracting the corresponding difference table D_Embedding2 based on the embedded representations Embedding 2 of the class 2 images, the calculation process is:

$$D\_Embedding1_{i,j} = \sum_{s,t} W_{s,t}^{c2} \, Embedding1_{i-k+1+s, j-k+1+t} - \sum_{p,q} W_{p,q}^{c2} \, Embedding1_{i-\lfloor \frac{k}{2} \rfloor + p, j - \lfloor \frac{k}{2} \rfloor + q}$$

$$D\_Embedding2_{i,j} = \sum_{s,t} W_{s,t}^{c2} \, Embedding2_{i-k+1+s, j-k+1+t} - \sum_{p,q} W_{p,q}^{c2} \, Embedding2_{i-\lfloor \frac{k}{2} \rfloor + p, j - \lfloor \frac{k}{2} \rfloor + q}$$

wherein, $W_{s,t}^{c2}$ represents the weight parameters of the second channel at the position of k×k dimensional extended convolution kernel (s,t), and $W_{p,q}^{c2}$ represents the weight parameters of the second channel at the position of k×k dimensional extended convolution kernel (p,q).

The contrastive convolution module also comprises class activation maps calculation operation and enhanced representation calculation operation, specifically: utilizing the difference representations D_Embedding1 and the difference representations D_Embedding2 to calculate a class activation maps $M1^{ca}$ corresponding to the class 1 images and a class activation maps D_Embedding2 corresponding to the class 2 images, respectively, the calculation process is:

$$M1^{ca} = \begin{cases} 1, & \left| \frac{D\_Embedding1_{i,j}}{LS\_Embedding1_{i,j}} \right| < \lambda \\ 0, & \left| \frac{D\_Embedding1_{i,j}}{LS\_Embedding1_{i,j}} \right| \geq \lambda \end{cases}$$

$$LS\_Embedding1_{i,j} = \sum_{p,q} W_{p,q}^{c2} \, Embedding1_{i-\lfloor \frac{k}{2} \rfloor + p, j - \lfloor \frac{k}{2} \rfloor + q}$$

$$M2^{ca} = \begin{cases} 1, & \left| \frac{D\_Embedding2_{i,j}}{LS\_Embedding2_{i,j}} \right| < \lambda \\ 0, & \left| \frac{D\_Embedding2_{i,j}}{LS\_Embedding2_{i,j}} \right| \geq \lambda \end{cases}$$

$$LS\_Embedding2_{i,j} = \sum_{p,q} W_{p,q}^{c2} \, Embedding2_{i-\lfloor \frac{k}{2} \rfloor + p, j - \lfloor \frac{k}{2} \rfloor + q}$$

wherein, $LS\_Embedding1_{i,j}$ is weighted summation of all input elements $Embedding1_{i,j}$ of the Embedding1 with a local range k×k and weights $W_{p,q}^{c2}$ of corresponding position in the second channel, which is used to characterize the local representations of the input element $Embedding1_{i,j}$, $LS\_Embedding2_{i,j}$ is weighted summation of all input elements $Embedding2_{i,j}$ of the Embedding2 with a local range k×k and weights $W_{p,q}^{c2}$ of corresponding position in the second channel, which is used to characterize the local representations of the input element $Embedding2^{i,j}$, $\lambda$ is a hyperparameter, which is used to measure the degree of class activation.

Making the class activation maps $M1^{ca}$ and the standard local representation S_Embedding1 dot product to obtain the enhanced distribution representations E_Embedding1 of the class 1, and making the class activation maps $M2^{ca}$ and the standard local representation S_Embedding2 dot product to obtain the enhanced distribution representations E_Embedding2, the calculation process is:

$$E\_Embedding1_{i,j} = M1_{i,j}^{ca} \cdot S\_Embedding1_{i,j}$$

$$E\_Embedding1 \in R^{1 \times C \times h \times w}$$

$$E_{Embedding2_{i,j}} = M2_{i,j}^{ca} \cdot S_{Embedding2_{i,j}}$$

$$E\_Embedding2 \in R^{1 \times C \times h \times w}$$

wherein, $M1_{i,j}^{ca}$ is the class activation value corresponding the standard local representation $S\_Embedding1_{i,j}$ at position (i,j), $M2_{i,j}^{ca}$ is the class activation value corresponding the standard local representation $S\_Embedding2_{i,j}$ at position (i,j), $R^{1 \times C \times h \times w}$ is the dimension of E_Embedding1 or E_Embedding2, C is the number of channels in the two-dimensional convolutional layer, h×w represents the height and width represented by E_Embedding1.

In the embodiment, the commonality-specificity supervision module is used for commonality representations and specificity representations mapping, comprising a commonality supervision mechanism and a specificity supervision mechanism. Specifically, the commonality supervision mechanism is used to construct commonality supervision maps based on enhanced distribution representations, specificity supervision maps are constructed based on the commonality supervision maps, and the specific class target object region is constructed based on the commonality supervision maps and specificity supervision maps.

Figure 4:
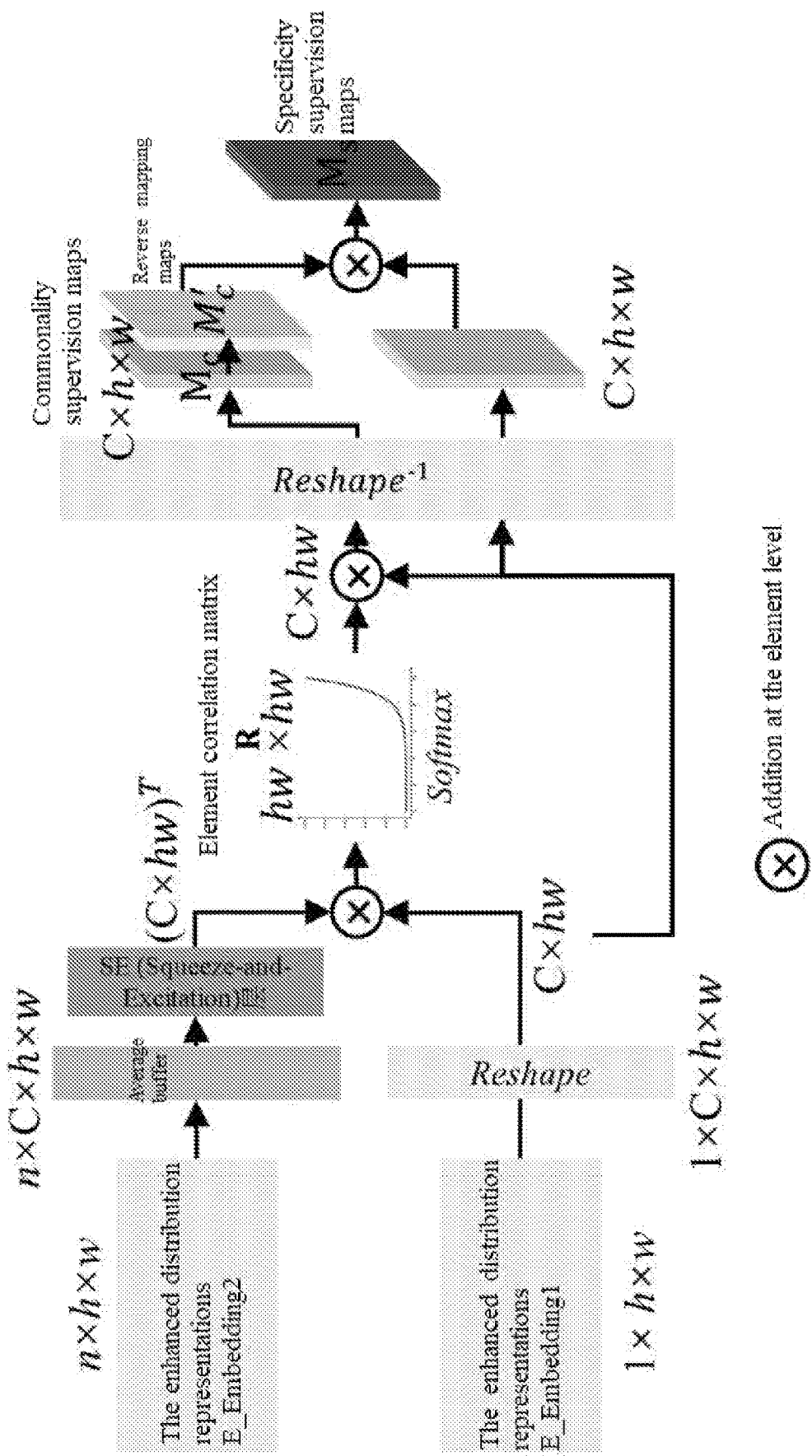
FIG. 4 is a schematic diagram of the commonality-specificity supervision module of the weakly supervised semantic segmentation model in an embodiment.

Specifically, as shown in FIG. 4, constructing the specificity supervision maps based on the enhanced distribution representations by using the commonality supervision mechanism, comprising:

(a) projecting the enhancement distribution representations E_Embedding1 onto a reshape layer for size adjustment, and projecting the E_Embedding1 representations with a dimension of 1×C×h×w onto a dimension of C×hw, obtaining a reorganized distribution $E\_Embedding1^{re}$ of the class 1 images, the calculation process is:

$$E\_Embedding1^{re} = Reshape(E\_Embedding1)$$

$$E\_Embedding1^{re} \in R^{C \times hw}$$

wherein, Reshape( ) is a dimension mapping function, which is used to map a representation dimension to a dimension of $R^{C \times hw}$.

(b) projecting the enhancement distribution representations E_Embedding2 of the class images onto an average buffer, the enhancement distribution representations E_Embedding2 is arranged in order and the average value is calculated to represent a mean enhancement distribution representation $E\_Embedding2^{ave}$ of the class 2 images, specially comprising:

the enhancement distribution representations E_Embedding2 is arranged in order to form the enhancement distribution representations Butter_Embedding with n×C×h×w, if n≤N, calculating the average value of the enhancement distribution representations Butter_Embedding with n×C×h×w, obtaining the mean enhancement distribution representation $E\_Embedding2^{ave}$; if n>N, randomly replacing the enhancement distribution representation $E\_Embedding2^m$ with 1×C×h×w dimension of the existing the enhancement distribution representations Butter_Embedding with n×C×h×w with the new input enhanced distribution representation E_Embedding2', then calculating the average value of the replaced enhancement distribution representations with n×C×h×w, obtaining the mean enhancement distribution representation $E\_Embedding2^{ave}$, the calculation process is:

$$E\_Embedding2^{ave} = \begin{cases} \sum_n E\_Embedding2^l, n \leq N, l \in [1, n] \\ E\_Embedding2^m = E\_Embedding2' \\ \sum_N E\_Embedding2^l, n > N, m \in [1, N] \end{cases}$$

wherein, the process of calculating the mean enhancement distribution representation using the average buffer occurs during the iterative training of parameter models by using weakly supervised semantic segmentation methods. There are constantly new input class 2 images that use the embedding layer and the contrastive convolution module to calculate the enhanced distribution representations E_Embedding2' of new class 2 images. N is the representation space of the average buffer, preferably set to 3. m is a random number within the integer range of 1 to N. n is the number of the enhanced distribution representations Butter_Embedding of sequential arrangement, E_Embedding2$^l$ represents the lth enhancement distribution representation in the average buffer.

(c) projecting the enhanced distribution representation E_Embedding2$^{ave}$ onto a SE layer to extract key structural features; E_Embedding2$^{struct}$ with dimension of C×hw, the calculation process is:

$$E\_Embedding2^{struct} = SE(E\_Embedding2^{ave})$$

$$E\_Embedding2^{struct} \in R^{C \times hw}$$

(d) calculating an element correlation matrix R for the class 1 images and the class 2 images based on the E_Embedding2$^{ave}$ of the class 2 images and the reorganized distribution E_Embedding1$^{re}$ of the class 1 images, the calculation process is:

$$R = \text{softmax}\left((E\_Embedding2^{struct})^T \times E\_Embedding1^{re}\right)$$

$$R \in R^{hw \times hw}$$

wherein, softmax represents a normalized exponential function that activates element features with high correlation between the class 1 images and the class 2 images.

(e) calculating the specificity supervision maps $M_c$ based on the element correlation matrix R and the reorganized distribution E_Embedding1$^{re}$, the calculation process is:

$$M_c = \text{Reshape}^{-1}(E\_Embedding1^{re} \times R)$$

$$M_c \in R^{c \times h \times w}$$

wherein, Reshape$^{-1}$ represents that E_Embedding1$^{re}$×R with c×hw dimension maps to c×h×w dimension.

Specifically, as shown in FIG. 4, the specificity supervision maps based on the commonality supervision maps are constructed by using the specificity supervision, comprising:

Firstly, reverse mapping the specificity supervision maps $M_c$ to obtain reverse mapping maps $M_c'$, the calculation process is:

$$M_c' = \begin{cases} 1, & \text{softmax}(M_c(i,j)) < 0.5 \\ 0, & \text{softmax}(M_c(i,j)) \geq 0.5 \end{cases}$$

the calculation process of the commonality supervision maps $M_s$ based on the reverse mapping maps $M_c'$:

$$M_s = \text{Reshape}^{-1}(E\_Embedding1^{re}) \times M_c'$$

wherein, softmax represents the softmax function, Reshape represents the reshape function.

Specifically, the specific class target object region is constructed based on the commonality supervision maps and the specificity supervision maps, comprising:

the specificity supervision maps $M_c$ is added to the embedded representations Embedding1 of the Class 1 images and the embedded representations Embedding2 of the Class 2 images, resulting in general structure enhanced representations of the Class 1 images and general structure enhanced representations of the Class 2 images, the commonality supervision maps $M_s$ is used to filter the specific class 1 target object region $F1_{cs}$ in the general structure enhanced representations of the Class 1 images, and the specific class 2 target object region $F2_{cs}$ in the general structure enhanced representations of the Class 2 images, the calculation process is:

$$F1_{cs} = \text{Embedding1} + M_c - M_s$$

$$F2_{cs} = \text{Embedding2} + M_c - M_s.$$

In the embodiment, the generator is used to generate the contrast generated images, specifically, the contrast generated images is generated based on the target object region, and the discriminator is used to determine the authenticity of the contrast generated images, the generator and discriminator form a confrontation framework, which can adopt any structure, optionally, the generator and discriminator adopt the basic framework of CycleGAN network. using the generator G to generate the contrast generated images $I1_C$ of the class 1 images, the calculation process is:

$$I1_C = G(F1_{cs})$$

the contrast generated images $I1_C$ is a generated image that drives the conversion of the structure distribution of the class 1 images to the structure distribution of the class 2 images.

In the embodiment, the knowledge gap module is used for object segmentation, specifically, calculating the semantic segmentation result Seg1 according to the class 1 images and its corresponding contrast generated images I1, which is expressed as:

$$Seg1 = I1 - I1_C$$

Step 3, establishing an objective function for the weakly supervised semantic segmentation model, In the embodiment, the objective function comprises an adversarial loss for training the generator and discriminator and a consistency loss for constructing the structural consistency between the contrast generated images and the class 1 images based on semantic segmentation results, specifically, the weighted sum of the adversarial loss and the consistency loss forms the objective function of the weakly supervised semantic segmentation model, preferably with each loss having a weight of 1. Below is a detailed explanation of each loss.

The adversarial loss of the generator G and the discriminator D is represented as $L_{adv}$, the calculation process is:

$$L_{adv} = -\sum_{i,j} \log(1 - D(G(F1_{cs}^{(i,j)}))) + \log(D(G(F2_{cs}^{(i,j)})))$$

The consistency loss is represented as $L_{cons}$, the calculation process is:

$$L_{cons} = \text{up}(M_c) \cdot |Seg1|$$

wherein, D represents the discriminator, and $F1_{cs}^{(i,j)}$ represents element values at position (i,j), and $F2_{cs}^{(i,j)}$ represents element values at position (i,j), up( ) represents sampling the $M_c$ into the size of the class 1 images, $M_c$ and the consistency loss is achieved by keeping the common structural parts as unchanged as possible.

Step 4, inputting the class 1 dataset and the class 2 dataset to the weakly supervised semantic segmentation model, utilizing the objective function to optimize the parameters of the weakly supervised semantic segmentation model, and obtaining the weakly supervised semantic segmentation model with optimized parameter;

In the embodiment, when optimizing the parameters of the weakly supervised semantic segmentation model, the parameters of the discriminator model are fixed, and the generator model parameters gradient corresponding to the adversarial loss $L_{adv}$ and the consistency loss $L_{cons}$ are respectively calculated, updating the parameters of the generator model based on the parameter gradient; fixing the parameters of the generator model and calculating the discriminator model parameters gradient corresponding to the adversarial loss $L_{adv}$, updating the parameters of the discriminator model based on the parameter gradient.

Step 5, the weakly supervised semantic segmentation model optimized by parameters is used to segment the target image to be detected, and semantic segmentation annotations at the pixel level of the target image are obtained.

After training, the weakly supervised semantic segmentation model optimized by parameters can be used to semantic segmentation. The selected target image to be segmented can be input into the weakly supervised semantic segmentation model, and the semantic segmentation results with pixel level of the target image can be obtained as the semantic label after calculation.

The above weakly supervised semantic segmentation method based on the commonality-specificity supervision mechanism provided by the embodiment is implemented based on the class annotation supervision signal with image level, and the weak supervision signal with image level is the easiest to obtain in daily applications. Among them, the embodiment proposes a contrastive convolution module, which uses the convolution cognitive differences of different receptive fields in the image to identify the ambiguous boundary regions in the image, and overcomes the problem of fuzzy segmentation boundary in the weakly supervised semantic segmentation task; then, the commonality-specificity supervision module is designed, which uses the commonality supervision mechanism to find the similar structural background distribution between different types of images, and uses the specificity supervision mechanism to identify the prominent regions in the image distribution, so as to achieve the semantic segmentation of the target object, which not only improves the sparse location region, but also optimizes the segmentation boundary; finally, the proposed knowledge gap module will input the images with enhanced internal distribution of images and the structural distribution of similarity between images into the generator, and constructing the contrast generated images with enhanced structural distribution, the knowledge gap between the contrast generated images and the class images effectively overcomes the incomplete activation correspondence in the mainstream method, and improves the weakly supervised semantic segmentation performance at the image level.

Figure 5:
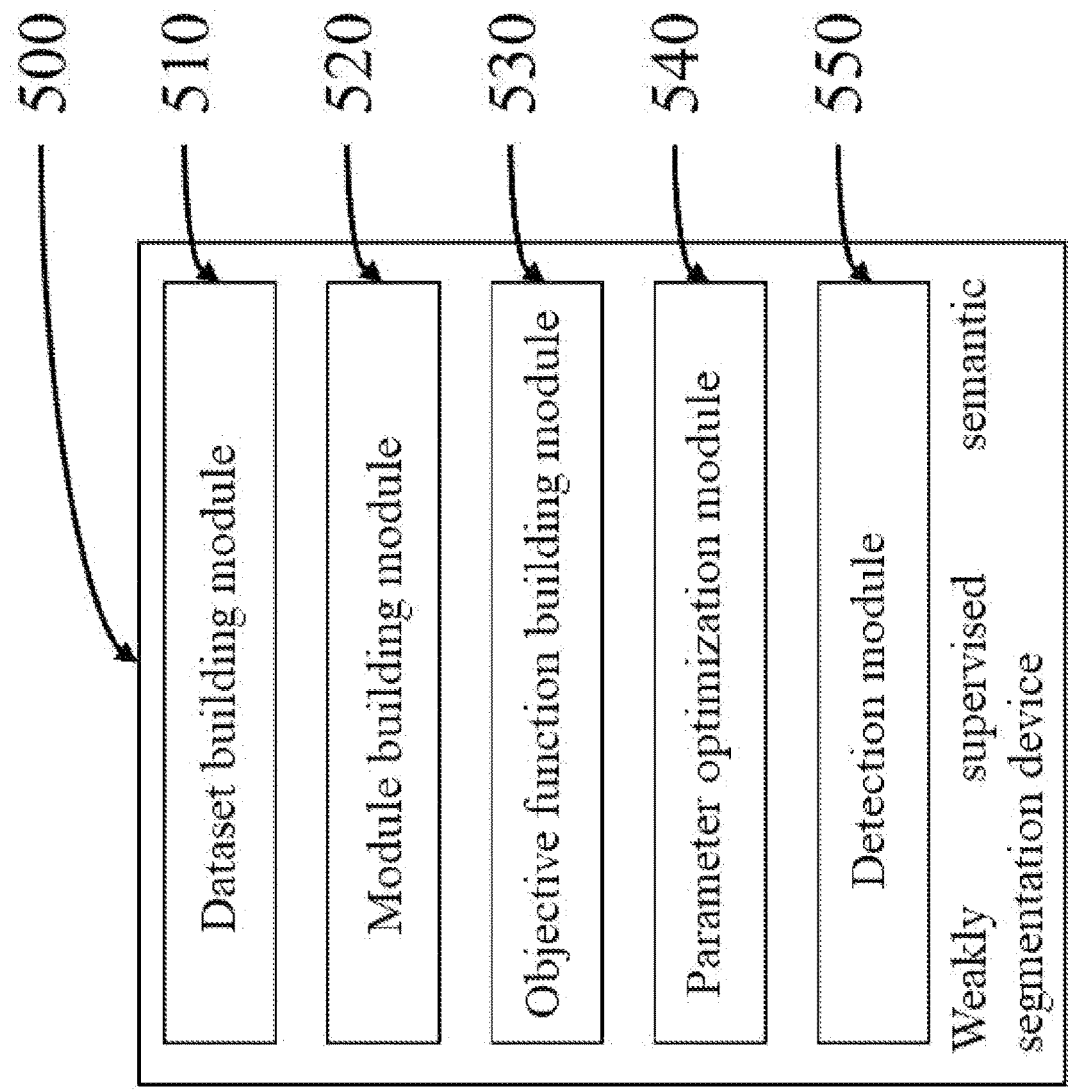
FIG. 5 is a schematic diagram of the structure of a weakly supervised semantic segmentation device based on the commonality-specificity supervision mechanism in an embodiment.

Based on the same invention concept, the embodiment also provides a weakly supervised semantic segmentation device based on the commonality-specificity supervision mechanism, as shown in FIG. 5, the unsupervised domain adaptation device 500 comprises:

a dataset building module 510, establishing a class 1 dataset with image level annotations and a class 2 dataset with image level annotations;

a module building module 520, establishing a weakly supervised semantic segmentation model;

an objective function building module 530, establishing an objective function for the weakly supervised semantic segmentation model;

a parameter optimization module 540, using the class 1 dataset and the class 2 dataset, and utilizing the objective function to optimize the parameters of the weakly supervised semantic segmentation model;

a detection module 550, the weakly supervised semantic segmentation model optimized by parameters is used to segment the target image to be detected, and semantic segmentation annotations at the pixel level of the target image are obtained.

It should be noted that the weakly supervised semantic segmentation device based on the commonality-specificity supervision mechanism provided by the embodiment should take the division of the above functional modules as an example when performing the learning and application process of weakly supervised semantic segmentation at the image level. The above functions can be allocated by different functional modules as needed, that is, the internal structure of the terminal or server can be divided into different functional modules to complete all or part of the functions described above. In addition, the weakly supervised semantic segmentation device provided by the embodiment belongs to the same concept as the embodiment of the weakly supervised semantic segmentation method, and its specific implementation process is detailed in the embodiment of the weakly supervised semantic segmentation method based on the commonality-specificity supervision mechanism, which will not be repeated here.

Based on the same invention concept, the embodiment also provides a computing device, comprising a memory, a processor, and a computer program stored in the memory and executable on the processor, the processor implements the weakly supervised semantic segmentation method based on the commonality-specificity supervision mechanism as described in above when executing the computer program, specifically comprising:

Step 1, establishing a class 1 dataset with image level annotations and a class 2 dataset with image level annotations;

Step 2, establishing a weakly supervised semantic segmentation model;

Step 3, establishing an objective function for the weakly supervised semantic segmentation model;

Step 4, using the class 1 dataset and the class 2 dataset, and utilizing the objective function to optimize the parameters of the weakly supervised semantic segmentation model;

Step 5, the weakly supervised semantic segmentation model optimized by parameters is used to segment the target image to be detected, and semantic segmentation annotations at the pixel level of the target image are obtained.

Based on the same invention concept, the embodiment also provides a computer-readable storage medium on which a computer program is stored, wherein, the weakly supervised semantic segmentation method based on the commonality-specificity supervision mechanism is implemented when the computer program is processed and executed.

Those of ordinary skill in the art can understand that all or part of the processes in implementing the methods of the above embodiments can be completed by instructing relevant hardware through a computer program. The computer program can be stored in a non-volatile computer readable storage medium. When the computer program is executed, it can include the processes of the embodiments of the above methods. Any reference to memory, storage, database or other media used in the embodiments provided in the present application may include non-volatile and/or volatile memory. The nonvolatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration rather than a limitation, RAM can be obtained in various forms, such as static RAM (SRAM), dynamic RAM (DRAM), synchronous DRAM (SDRAM), dual data rate SDRAM (ddrsdram), enhanced SDRAM (esdram), synchronous link DRAM (sldram), Rambus direct RAM (RDRAM), direct memory bus dynamic RAM (drdram), and memory bus dynamic RAM (RDRAM).

The specific implementation methods mentioned above provide a detailed explanation of the technical solution and beneficial effects of the present invention. It should be understood that the above are only the optimal embodiments of the present invention and are not intended to limit the present invention. Any modifications, supplements, and equivalent replacements made within the scope of the principles of the present invention should be included in the scope of protection of the present invention.

The invention claimed is:

1. A weakly supervised semantic segmentation method based on the commonality-specificity supervision mechanism, comprising the following steps:

establishing a class 1 dataset and a class 2 dataset, wherein the class 1 dataset contains class 1 images and their image level labels, and the class 2 dataset contains class 2 images and their image level labels;

establishing a weakly supervised semantic segmentation model, which includes an embedding layer, a contrastive convolution module, a commonality-specificity supervision module, a generator, a discriminator, and a knowledge gap module, the embedding layer is used to spatially maps the class 1 images and the class 2 images to obtain embedded representations, while the contrastive convolution module is used to spatially enhance the embedded representations to obtain enhanced distribution representations, the commonality-specificity supervision module is used to construct specificity supervision maps based on the enhanced distribution representations by using a commonality supervision mechanism, specificity supervision maps based on the commonality supervision maps are constructed by using a specificity supervision, a specific class target object region is constructed based on the commonality supervision maps and the specificity supervision map, a generator is used to generate contrast generated images based on the target object region, and the discriminator is used to distinguish the authenticity of the contrast generated images, the knowledge gap module is used to generate semantic segmentation results based on the class 1 images and their corresponding contrast generated images;

establishing an objective function for the weakly supervised semantic segmentation model, the objective function comprises an adversarial loss for training the generator and discriminator and a consistency loss for constructing the structural consistency between the contrast generated images and the class 1 images based on semantic segmentation results;

using the class 1 dataset and the class 2 dataset, and utilizing the objective function to optimize the parameters of the weakly supervised semantic segmentation model;

using the weakly supervised semantic segmentation model optimized by parameters to segment the target image to be detected, and obtaining semantic segmentation annotations at the pixel level of the target image.

2. The weakly supervised semantic segmentation method based on the commonality-specificity supervision mechanism according to claim 1, wherein, the embedding layer comprises a sequentially connected boundary filling layer, a two-dimensional convolutional layer, an instance regularization layer, and a linear rectification activation layer, the embedded representations Embedding1 of the class 1 images and the embedded representations embedding2 of the class 2 images are obtained by spatially mapping the class1 images and the class 2 images through the embedding layer.

3. The weakly supervised semantic segmentation method based on the commonality-specificity supervision mechanism according to claim 1, wherein, the contrastive convolutional module comprises a dual channel mode, wherein, the first channel comprises a sequentially connected two-dimensional convolutional layer and a linear rectification activation layer, extracting the corresponding standard local representation S_Embedding1 based on the embedded representations Embedding1 of the Class 1 images, and extracting the corresponding standard local representation S_Embedding2 based on the embedded representations Embedding2 of the Class 2 images;

the second channel comprises contrastive convolution, the contrastive convolution comprises an extended convolution layer and a two-dimensional convolution layer, extracting the corresponding difference representation D_Embedding1 based on the embedded representations Embedding 1 of the class 1 images, and extracting the corresponding difference table D_Embedding2 based on the embedded representations Embedding 2 of the class 2 images;

the contrastive convolution module also comprises class activation maps calculation operation and enhanced representation calculation operation, specifically:

utilizing the difference representations D_Embedding1 and the difference representations D_Embedding2 to calculate a class activation maps $M1^{ca}$ corresponding to the class 1 images and a class activation maps D_Embedding2 corresponding to the class 2 images, respectively;

making the class activation maps $M1^{ca}$ and the standard local representation S_Embedding1 dot product to obtain the enhanced distribution representations E_Embedding1 of the class 1, and making the class activation maps $M2^{ca}$ and the standard local representation S_Embedding2 dot product to obtain the enhanced distribution representations E_Embedding2.

4. The weakly supervised semantic segmentation method based on the commonality-specificity supervision mechanism according to claim 1, wherein, in the commonality-specificity supervision module, constructing the specificity supervision maps based on the enhanced distribution representations by using the commonality supervision mechanism, comprising:

projecting the enhancement distribution representations E_Embedding1 onto a Reshape layer for size adjustment to obtain a reorganized distribution $E\_Embedding1^{re}$ of the class 1 images;

projecting the enhancement distribution representations E_Embedding2 onto an average buffer, the enhancement distribution representations E_Embedding2 is arranged in order and the average value is calculated to represent a mean enhancement distribution representation $E\_Embedding2^{ave}$ of the class 2 images;

projecting the enhanced distribution representation $E\_Embedding2^{ave}$ onto a SE layer to extract key structural features;

calculating an element correlation matrix R for the class 1 images and the class 2 images based on the $E\_Embedding2^{ave}$ of the class 2 images and the reorganized distribution $E\_Embedding1^{re}$ of the class 1 images;

calculating the specificity supervision maps $M_c$ based on the element correlation matrix R and the reorganized distribution $E\_Embedding1^{re}$.

5. The weakly supervised semantic segmentation method based on the commonality-specificity supervision mechanism according to claim 1, wherein, in the commonality-specificity supervision module, the specificity supervision maps based on the commonality supervision maps are constructed by using the specificity supervision, comprising:

reverse mapping the specificity supervision maps $M_c$ to obtain a reverse mapping maps $M_c'$, the calculation process is:

$$M_c' = \begin{cases} 1, & \text{softmax}(M_c(i,j)) < 0.5 \\ 0, & \text{softmax}(M_c(i,j)) \geq 0.5 \end{cases}$$

the calculation process of the commonality supervision maps $M_s$ based on the reverse mapping maps $M_c'$:

$$M_s = \text{Reshape}^{-1}(E\_Embedding1^{re}) \times M_c'$$

wherein, softmax represents the softmax function, Reshape represents the reshape function.

6. The weakly supervised semantic segmentation method based on the commonality-specificity supervision mechanism according to claim 5, wherein, in the commonality-specificity supervision module, the specific class target object region is constructed based on the commonality supervision maps and the specificity supervision map, comprising:

the specificity supervision maps $M_c$ is added to the embedded representations Embedding1 of the Class 1 images and the embedded representations Embedding2 of the Class 2 images, resulting in general structure enhanced representations of the Class 1 images and general structure enhanced representations of the Class 2 images, the commonality supervision maps $M_s$ is used to filter the specific class 1 target object region $F1_{cs}$ in the general structure enhanced representations of the Class 1 images, and the specific class 2 target object region $F2_{cs}$ in the general structure enhanced representations of the Class 2 images, the calculation process is:

$$F1_{cs} = \text{Embedding1} + M_c - M_s$$
$$F2_{cs} = \text{Embedding2} + M_c - M_s.$$

7. The weakly supervised semantic segmentation method based on the commonality-specificity supervision mechanism according to claim 1, wherein, in the knowledge gap module, generating semantic segmentation results based on the class 1 images and their corresponding contrast generated images, comprising:

using the difference between the class 1 images and their corresponding contrast generated images as the semantic segmentation results;

the adversarial loss $L_{adv}$ is represented as:

$$L_{adv} = -\sum_{i,j} \log(1 - D(G(F1_{cs}^{(i,j)}))) + \log(D(G(F2_{cs}^{(i,j)})))$$

the consistency loss is represented as:

$$L_{cons} = \text{up}(M_c) \cdot |Seg1|$$

among them, G represents the generator, D represents the discriminator, and $F1_{cs}^{(i,j)}$ represents element values of the specific class 1 target object regions $F1_{cs}$ corresponding to the class 1 images at position (i,j), and $F2_{cs}^{(i,j)}$ represents element values of the specific class 2 target object regions $F2_{cs}$ corresponding to the class 2 images at position (i,j), Seg1 represents the semantic segmentation results, I1 represents the class 1 images, and up( ) represents sampling the $M_c$ into the size of the class 1 images, $M_c$ represents the specificity supervision maps.

8. A weakly supervised semantic segmentation device based on the commonality-specificity supervision mechanism comprising:

a dataset building module, establishing a class 1 dataset and a class 2 dataset, the class 1 dataset contains class 1 images and their image level labels, and the class 2 dataset contains class 2 images and their image level labels;

a module building module, establishing a weakly supervised semantic segmentation model, which includes an embedding layer, a contrastive convolution module, a commonality-specificity supervision module, a generator, a discriminator, and a knowledge gap module, the embedding layer is used to spatially maps the class 1 images and the class 2 images to obtain embedded representations, while the contrastive convolution module is used to spatially enhance the embedded representations to obtain enhanced distribution representations, the commonality-specificity supervision module is used to construct specificity supervision maps based on the enhanced distribution representations by using a commonality supervision mechanism, specificity supervision maps based on the commonality supervision maps are constructed by using a specificity supervision, a specific class target object region is constructed based on the commonality supervision maps and the specificity supervision map, a generator is used to generate the contrast generated images based on the target object region, and a discriminator is used to distinguish the authenticity of the contrast generated images, the knowledge gap module is used to generate semantic segmentation results based on the class 1 images and their corresponding contrast generated images;

an objective function building module, establishing an objective function for the weakly supervised semantic segmentation model, the objective function comprising an adversarial loss for training the generator and discriminator and a consistency loss for constructing the structural consistency between the contrast generated images and the class 1 images based on semantic segmentation results;

a parameter optimization module, using the class 1 dataset and the class 2 dataset, and utilizing the objective function to optimize the parameters of the weakly supervised semantic segmentation model;

a detection module, the weakly supervised semantic segmentation model optimized by parameters is used to segment the target image to be detected, and semantic segmentation annotations at the pixel level of the target image are obtained.

9. A computing device, wherein, comprising a memory, a processor, and a computer program stored in the memory and executable on the processor, the processor implements the weakly supervised semantic segmentation method based on the commonality-specificity supervision mechanism as described in claim 1 when executing the computer program.

10. A computer-readable storage medium on which a computer program is stored, wherein, the weakly supervised semantic segmentation method based on the commonality-specificity supervision mechanism as described in claim 1 when the computer program is processed and executed.

* * * * *